United States Patent [19]

Müller

[11] Patent Number: 4,980,621
[45] Date of Patent: Dec. 25, 1990

[54] CONTROL ARRANGEMENT FOR CONTROLLING THE POWER SUPPLIED TO AN ELECTRIC MOTOR

[75] Inventor: Richard Müller, Lynchburg, Va.

[73] Assignee: Gebruder Hofmann GmbH & Co. KG Maschinenfabrik, Pfungstadt, Fed. Rep. of Germany

[21] Appl. No.: 438,250

[22] Filed: Nov. 20, 1989

[51] Int. Cl.$^5$ .................. H02P 5/00; G01M 1/16
[52] U.S. Cl. .................. 318/269; 318/270; 318/277; 73/66; 73/462
[58] Field of Search ............ 318/52, 68, 69, 70, 318/71, 77, 78, 98, 99, 269, 270–277, 449, 450, 558, 638, 654, 830; 73/66, 457, 459, 460, 462, 487

[56] References Cited

U.S. PATENT DOCUMENTS

| | | | |
|---|---|---|---|
| 3,508,133 | 4/1970 | Schneider et al. | 318/275 |
| 4,062,242 | 12/1977 | Brihier | 73/462 |
| 4,085,619 | 4/1978 | Shapiro et al. | 73/462 |
| 4,302,813 | 11/1981 | Kurihara et al. | 73/462 X |
| 4,464,934 | 8/1984 | Giers | 73/462 |
| 4,506,339 | 3/1985 | Kuhnlein | 73/462 X |
| 4,518,899 | 5/1985 | Wolf | 318/68 |
| 4,617,497 | 10/1986 | Wolf | 318/78 |
| 4,868,762 | 9/1989 | Grim et al. | 73/462 X |

*Primary Examiner*—Bentsu Ro
*Attorney, Agent, or Firm*—Cushman, Darby & Cushman

[57] ABSTRACT

A control arrangement for controlling the power supplied to an electric motor connected to a rotary member to drive same in rotation by way of a belt drive, to accelerate the rotary member to a given speed and to brake it in a slip-free manner provides that a signal which is proportional to the speed of rotation of the rotary member is compared to a signal which is proportional to the speed of rotation of the motor. The supply of power to the electric motor is correspondingly controlled in dependence on the result of the comparison operation.

16 Claims, 2 Drawing Sheets

CONTROL ARRANGEMENT FOR CONTROLLING THE POWER SUPPLIED TO AN ELECTRIC MOTOR

BACKGROUND OF THE INVENTION

In regard to driving rotary members, more especially rotary members which are of large mass and/or which have a large periphery, being driven by an electric motor by way of a belt transmission, a problem which often arises is that of bringing the motor up to a reference speed of rotation within a reasonable time, without an excessive amount of slip at the belt. In that connection, there is the danger that, if the acceleration applied is excessively high, the drive belt will run hot as a result of slip and will accordingly suffer from a high rate of wear. That problem is even worse in regard to decelerating the rotary member in order to bring it to a stop. If the motor is simply switched off, the rotary member then continues to rotate by virtue of its inertia, due to its substantial mass, and it may be up to half an hour before the rotary member comes to a stop, when the rotary member is of considerable mass. If the motor is switched off when the rotary member is stationary, the motor reverses for a long time and begins to drive the rotary member in the reverse direction. In that respect, in both situations, a considerable amount of heat is generated, and not only when accelerating the rotary member to its reference speed of rotation but in particular also when braking the rotor, and a considerable amount of time is required to stop the rotor.

SUMMARY OF THE INVENTION

An object of the present invention is to provide a control arrangement for controlling the power supplied to an electric motor to produce a controlled speed of rotation thereof, which does not suffer from the above-indicated disadvantages.

Another object of the invention is to provide a control arrangement for controlling the power supplied to an electric motor to drive a rotary member or rotor, which can provide for substantially slip-free acceleration to a predetermined rotary speed, in an optimum acceleration time, and substantially slip-free deceleration of the rotary member or rotor from the predetermined rotary speed to a stopped condition, in an optimum braking time.

Still another object of the present invention is to provide a control arrangement for the power supplied to an electric motor for driving a rotary member or rotor, which is adapted to provide for a sensitive control effect in regard to acceleration and deceleration of the rotary member or rotor.

In accordance with the teachings of the present invention these and other objects are attained by a control arrangement for controlling the power supplied to an electric motor to produce a controlled speed of rotation of the electric motor which by way of a belt drive accelerates a rotary member or rotor up to a given speed of rotation and decelerates it, comprising a means for monitoring the speed of rotation of the rotor, to supply a signal proportional to the speed of rotation of the rotor. The arrangement further includes a means for monitoring the speed of rotation of the rotary member, to supply a signal proportional to the speed of rotation thereof. An adjusting means provides for adjusting the respective ratio between the diameter of the part of the rotary member against which the drive belt of the belt drive assembly bears, and the diameter of a drive pulley around which the drive belt passes at the motor end of the drive belt assembly. A comparison means is connected to the adjusting means to compare the signal which is proportional to the speed of the rotary member, to the signal which is proportional to the speed of the motor, thereby to provide an output signal which is proportional to the result of the comparison operation. The output signal of the comparison means is supplied to a motor speed control means to provide for substantially slip-free drive and substantially slip free braking of the rotary member.

In another aspect of the present invention, with particular reference to a balancing machine which incorporates a control arrangement in accordance with the present invention, the means for monitoring the speed of rotation of the rotary member, thereby to supply a signal proportional to the speed of rotation thereof, comprises a sensing means for sensing a marking on the rotor and supplying an output signal which serves as a phase reference signal in determining the angular positioning of at least one unbalance to be measured on the rotary member, the signal which is proportional to the speed of rotation of the rotary member being derived from the output signal of the sensing means.

The control arrangement in accordance with the principles of the present invention therefore provides for monitoring the speed of the motor and the speed of the rotor. Two signals are accordingly produced, one signal being proportional to the speed of the motor and the other signal being proportional to the speed of the rotor. By virtue of the inclusion of the adjusting means for adjusting the ratio between the diameter of the part of the rotary member which is engaged by the drive belt of the drive assembly, and the diameter of the drive pulley of the drive assembly, which is driven by the motor and which may be carried for example on the shaft of the motor, it is possible, when dealing with rotary members of different diameters, for the rotary member to be precisely matched to the drive motor, in particular in relation to the operative diameter of the drive pulley which drives the belt for driving the rotary member in rotation. As the adjusting means is coupled to the comparison means for comparing the signal that is proportional to the speed of rotation of the rotary member to the signal that is proportional to the speed of rotation of the motor, the respective operative diameter at which the rotary member is driven by the belt can be matched to the operative diameter of the drive pulley in such a way that, when the apparatus is operating in a slip-free mode, that is to say both for producing slip-free acceleration and slip-free braking, the signal that is proportional to the speed of rotation of the rotary member and the signal that is proportional to the speed of rotation of the motor are of equal magnitudes so that the result of the comparison operation is zero and no output signal occurs at the output of the comparison means. Power is then supplied to the electric motor which in particular can be a dc motor, in the preset manner.

If slip occurs in the belt drive assembly, then the signal which is proportional to the speed of rotation of the motor and the signal which is proportional to the speed of rotation of the rotary member will differ from each other so that the output of the comparison means produces an output signal with which the supply of power to the electric motor, in particular the supply of current thereto, is reduced until the two signals are again equal and the result of the comparison operation again becomes zero. That can provide for both substantially slip-free acceleration and substantially slip-free braking of the rotor by means of the electric motor, with the optimum acceleration and braking times respectively.

In a preferred form of the braking mode, the same drive means as those which provide for the acceleration mode are operated with an electrical polarity which is inverted in relation to the acceleration mode.

Further objects, features and advantages of the present invention will be apparent from the following description of preferred embodiments thereof.

DESCRIPTION OF PREFERRED EMBODIMENTS

Figure 1:
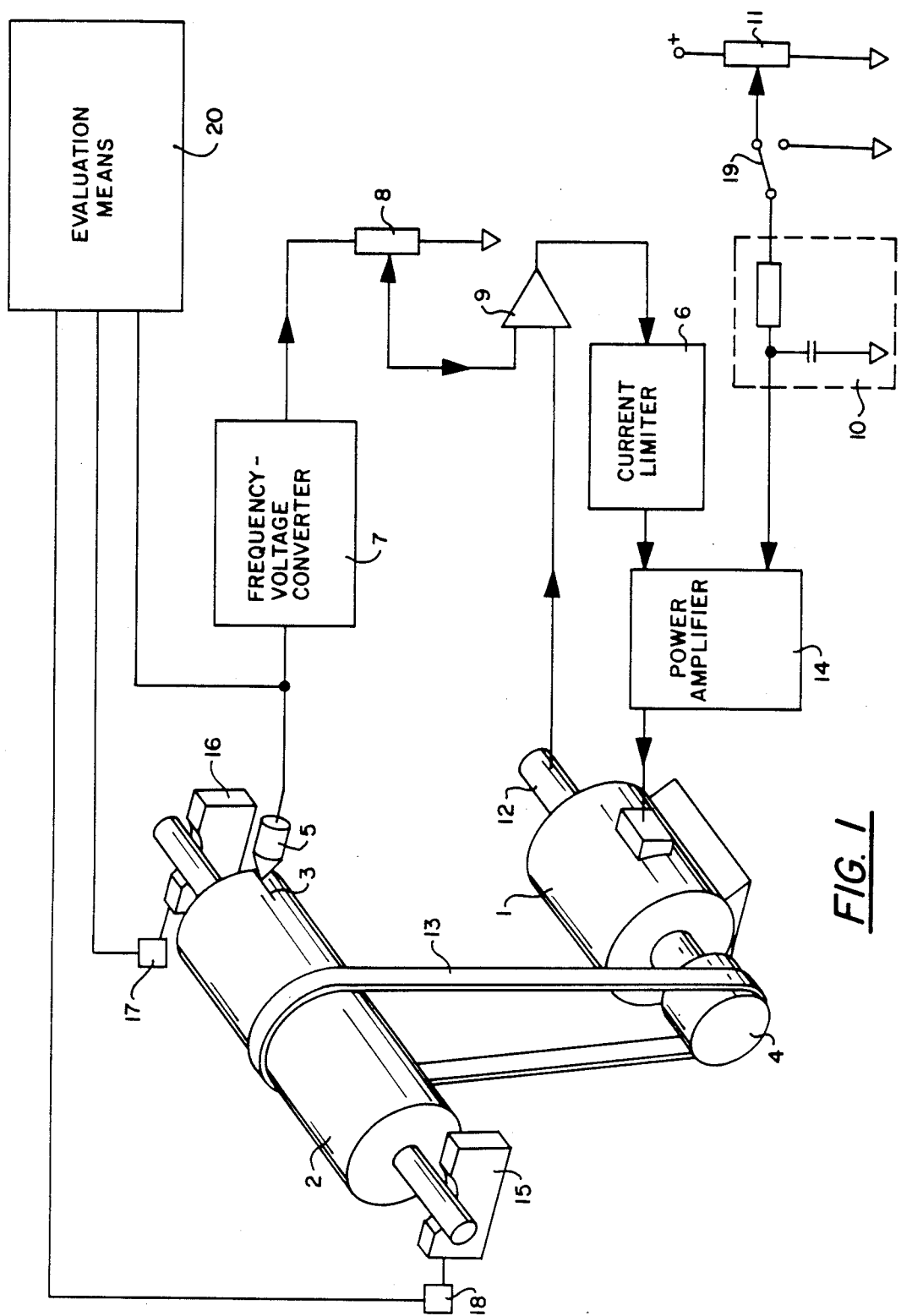
FIG. 1 is a diagrammatic view of a first embodiment of the control arrangement according to the invention.

Referring firstly to FIG. 1, shown therein is an electric motor which can preferably be in the form of a dc motor, while reference numeral 2 denotes a rotor or rotary member which is to be driven in rotation by the electric motor 1. The drive from the electric motor 1 to the rotary member 2 is by way of a drive belt 13 which passes around a belt pulley 4 carried on the shaft of the electric motor 1, and around the rotary member 2.

It may be noted at this point that the rotary member 2 may be for example a rotary member which needs to be balanced, for which purpose it is suitably mounted in a balancing machine. In that connection, reference numerals 15 and 16 in FIG. 1 identify suitable balancing machine bearing means for supporting the rotary member 2. Coupled to the bearing means 15 and 16 are measurement value pick-up means or sensors 17 and 18 which can detect any unbalance of the rotor, which is ascertained during a measuring run. Balancing machine bearing means of that kind with measurement value pick-up means coupled thereto are known in the balancing art and do not therefore need to be described in greater detail herein.

The control arrangement illustrated in FIG. 1 for controlling the power supplied to the electric motor 1, in the form of a drive or feed current, comprises a means indicated diagrammatically at 12 for monitoring the speed of rotation of the motor, for example in the form of a tachogenerator. The monitoring means 12 produces at its output a signal which is proportional to the speed of rotation of the motor 1 and which may be an output voltage that is proportional to the speed of the motor. That output signal is passed to a comparison means 9 which is suitably connected to the monitoring means 12.

The illustrated arrangement also includes a means comprising components 3, 5 and 7 for monitoring the speed of rotation of the rotary member 2. The monitoring means 3, 5 and 7 comprises a sensing means 5 which can be for example in the form of a photoelectric sensor. The sensing means 5 is operable to sense a marking 3 on the rotary member 2. In each revolution of the rotary member, the marking 3 is detected by the sensing means 5 which then outputs a suitable output signal, more particularly in pulse form. In the illustrated arrangement therefore the sensing means 5 produces at its output a chain of pulses, the frequency of which depends on the speed of rotation of the rotary member 2.

The chain of pulses outputted by the sensing means 5, being dependent in respect of frequency on the speed of rotation of the rotary member 2, is then passed to a frequency-voltage converter indicated at 7. At its output, the converter 7 produces a signal in the form of an output voltage which is proportional to the speed of rotation of the rotary member 2. Frequency-voltage conversion can be effected in conventional manner, for example by means of a multivibrator which is fed with a signal that is proportional to the speed of rotation, and a pulse integrator which is disposed on the output side of the multivibrator, as disclosed for example in Canadian specification No. 865 405 to which reference is suitably directed as appropriately incorporating the content thereof.

In the arrangement illustrated in FIG. 1, the output voltage of the frequency-voltage converter 7 is passed to the comparison means 9 by way of an adjusting means 8 which is in the form of a potentiometer. The adjusting means 8 is operable to adjust the ratio of the diameter of the drive pulley 4 which is carried on the shaft of the motor 1 and around which the drive belt 13 passes, relative to the diameter of the rotary member 2, more particularly the diameter of the rotary member 2 at the part thereof around which the drive belt 13 passes, to drive the rotary member 2 in rotation.

By virtue of that design configuration, when dealing with different diameters of the rotary member 2, it is possible to provide for matching of the rotary member 2 which is driven by the electric motor 1 by way of the belt drive comprising the pulley 4 and the drive belt 13, to the diameter of the pulley 4 which normally remains constant.

The matching effect referred to above is so selected, by means of the adjusting means 8, that is to say by suitable setting of the potentiometer representing the adjusting means 8, that, when the belt drive assembly is driving the rotary member in a slip-free manner, the two signals which are fed to the input side of the comparison means 9, that is to say the signal which is proportional to the speed of rotation of the rotary member 2, coming from the monitoring means 3, 5 and 7, and the signal which is proportional to the speed of the electric motor 1, coming from the monitoring means 12, are equal. No signal then appears at the output of the comparison means 9.

Figure 2:
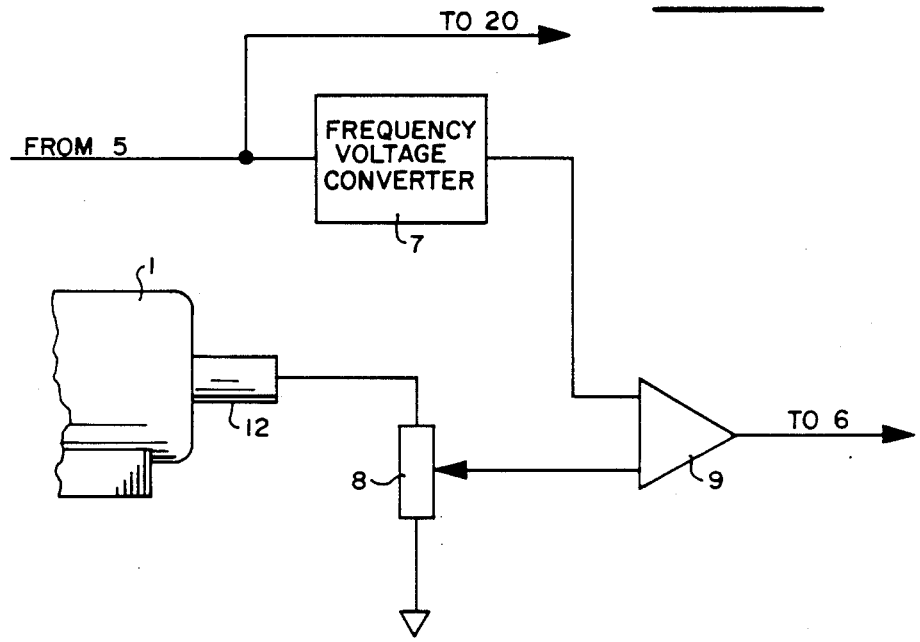
FIG. 2 is a diagrammatic view of a modification of the embodiment illustrated in FIG. 1.

Reference will be made at this point to FIG. 2 which shows a modified configuration of part of the circuitry, in which the adjusting means is connected to the output of the monitoring means 12 which supplies the signal that is proportional to the speed of rotation of the electric motor 1 and which can be in the form of a tachogenerator, as referred to above. The adjusting means 8 is also connected to one input of the comparison means 9. The other input of the comparison means 9 is then connected to the output of the means for monitoring the speed of rotation of the rotary member 2, more particularly to the output of the frequency-voltage converter 7 whose input is connected to the sensing means 5 for sensing the marking 3 on the rotary member 2. In the FIG. 2 arrangement, the diameter of the part of the rotary member 2 around which the drive belt indicated at 13 in FIG. 1 passes can also be adjusted to the diameter of the drive pulley 4 driven by the electric motor 1, by the operation of the adjusting means 8, in such a way that, when the drive is operating in a slip-free condition, the two signals which are supplied to the comparison means 9 from the monitoring means 12 and the monitoring means 5 and 7, are equal. When the signal that is proportional to the speed of rotation of the rotor and the signal which is proportional to the speed of rotation of the motor are equal, the comparison means 9 does not produce a signal at its output, when the drive arrangement is operating in a slip-free manner.

Reverting now to FIG. 1 for description of the remainder of the circuitry of the control arrangement according to the invention, a motor speed control means which is used in the illustrated embodiment comprises a means 11 for setting the speed of rotation of the rotary member 2, in the form of a potentiometer. The potentiometer can be connected by way of an on-off switch 19 to an acceleration/braking adjusting means 10 in the form of an RC-member. The output of the acceleration/braking adjusting means 10 which at its output supplies a feed voltage which rises linearly with time, is connected to a power amplifier 14. The feed voltage rises to a value which is set by the potentiometer 11.

A second input of the power amplifier 14 is connected to the output of the comparison means 9 by way of a current limiter circuit indicated diagrammatically at 6. A signal at the output of the current limiter circuit 6 produces a reduction in the current in the power amplifier 14.

As long as no slip occurs between the rotary member and the drive belt and the drive pulley 4 when the rotary member 2 is being started up and accelerated by the electric motor 1, the signals which are proportional to the speed of rotation of the rotary member 2 and the electric motor 1 respectively and which are fed to the comparison means 9 are identical so that no signal occurs at the output of the comparison means 9. The rotary member is then accelerated in dependence on the rising voltage formed by the acceleration/braking adjusting means (RC-member) 10, up to the motor speed which is predetermined by the speed adjusting means or potentiometer 11.

If slip occurs in the transmission of drive from the electric motor 1 to the rotary member 2, the two signals which are fed to the comparison means 9 and which are thus proportional to the speed of rotation of the rotary member and the motor respectively differ. In that case the comparison means 9 will output an output signal which is proportional to the difference between the two signals and which actuates the current limiter circuit 6. The current in the electric motor is then subjected to a corresponding limitation effect.

For the purposes of braking the rotor 2 from its nominal speed to a stop, power is supplied to the electric motor 1, with current of reversed polarity. If the braking mode takes place in a slip-free manner, then there is no reduction in current, by way of the current limiter circuit 6. The acceleration/braking adjusting means 10 determines the braking time, just as it also determines the acceleration time.

In the event of slip occurring as between the rotary member 2, the drive belt 13 and the drive pulley 4, the two signals applied to the comparison means 9 again differ so that the output signal of the comparison means 9 correspondingly actuates the current limiter circuit 6 to limit the current involved.

It will be noted that the above-described control arrangement for controlling the power supplied to the electric motor 1 in order to provide for substantially slip-free acceleration and deceleration of the rotary member 2 may be used with any belt drive assembly, in particular when driving a rotary member of substantial mass. The rotary member 2 illustrated in FIG. 1 is a rotary member or rotor which is mounted in a balancing machine bearing assembly as indicated at 15 and 16. For measuring unbalance of the rotary member 2, the rotary member is brought up to a given speed of rotation and measurement signals corresponding to unbalance of the rotary member 2 are passed from the measurement value pick-up means 17 and 18 to an evaluation means indicated diagrammatically at 20. In order to ascertain the angular positions of the unbalance which is detected by the measurement value pick-up means 17 and 18, the evaluation means 20 also receives the output signal from the sensing means 5, as a phase reference or angle reference signal. In the illustrated embodiment therefore that signal is used as a phase reference signal in measurement of the unbalance from which the rotary member suffers, and for forming a signal which is proportional to the speed of rotation of the rotary member 2, by means of the frequency-voltage converter 7.

Evaluation circuits and devices which are suitable for use in the evaluation means 20 in which the signals supplied by the measurement value pick-up means or sensors 17 and 18 and the sensing means 5 are evaluated in order to measure the unbalance of the rotary member 2 are known in the balancing art, as disclosed for example in the publication Hofmann Info May 2, 1988, to which reference is directed as suitably incorporating the content thereof.

Figure 3:
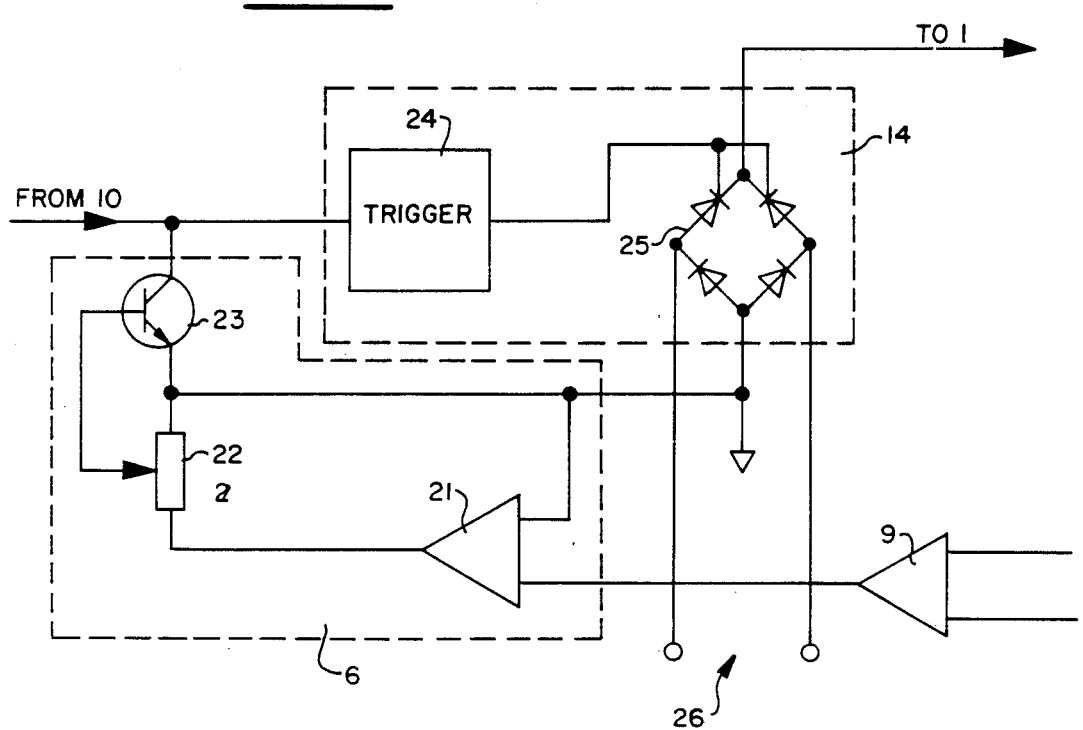
FIG. 3 shows an embodiment of a circuit for a current limiter and a power amplifier which can be used in the arrangement in accordance with the invention.

Reference will now be made to FIG. 3 illustrating circuit arrangements of the current limiter means 6 and the power amplifier 14. The current limiter 6 illustrated in FIG. 3 has a current amplifier 21 which is fed by the output signal from the comparison means 9. If the output current of the amplifier current 21 exceeds a current strength which can be set by a potentiometer 22, current is supplied to the base of a current limiter transistor 23 by way of the potentiometer tapping. The current limiter transistor 23 then short-circuits to ground the output side of the acceleration/braking adjusting means 10. As a result of the reduced supply of current to the electric motor, the slip which is occurring in the transmission arrangement is eliminated and the output signal at the comparison means 9 goes back to zero again. The current limiter transistor 23 is then switched off and the preset feed of current to the power amplifier 14 is then restored by the acceleration/braking adjusting means 10.

The power amplifier 14 has a trigger circuit 24 which serves to fire a silicon-controlled rectifier bridge or SCR-bridge 25. The bridge 25 is connected to a dc voltage source 26 while the output signal of the bridge 25 is passed to the armature winding of the dc motor 1.

It will be appreciated from the foregoing that the control arrangement according to the invention can not only reduce the periods of time required for acceleration and deceleration of the rotary member 2, for example a rotor which needs to be balanced in a balancing machine, but in addition the service life of the drive belt which is used in the transmission of drive from the electric motor to the rotary member can also be enhanced by virtue of the reduction in the amount of slip to which it is subjected in the course of operation of the arrangement.

It will be appreciated that the above-described arrangement has been set forth solely by way of example and illustration of the principles of the present invention and that various other modifications and alterations may be made therein without thereby departing from the spirit and scope of the invention.

I claim:

1. A control arrangement for power supplied to an electric motor to produce a controlled speed of rotation of the motor which, by way of a belt drive having a drive belt and a drive pulley adapted to be driven by the motor, accelerates a rotary member up to a given speed of rotation and brakes it, comprising:
- a means for monitoring the speed of rotation of the motor and operate to supply a first signal which is proportional to the speed of the rotation of the motor;
- a means for monitoring the speed of rotation of the rotary member and operate to supply a second signal which is proportional to the speed of rotation of the rotary member;
- an adjusting means for adjusting the strength of one of the first and the second signals;
- a comparison means, connected to the adjusting means to receive the one adjusted signal and connected to receive the other of the first and second signals, for comparing the adjusted signal and the other signal and for supplying an output signal which is proportional to the result of the comparison; and
- a motor speed control means connected to the output of the comparison means for receiving the output signal of the comparison means and operable to control the motor for slip-free drive and slip-free braking of the rotary member.

2. A control arrangement as set forth in claim 1 wherein the adjusting means is connected between said means for monitoring the speed of rotation of the rotary member and said comparison means.

3. A control arrangement as set forth in claim 1 wherein the adjusting means is connected between said means for monitoring the speed of rotation of the motor and said comparison means.

4. A control arrangement as set forth in claim 1 wherein the means for monitoring the speed of rotation of the motor and the means for monitoring the speed of rotation of the rotary member are adapted to generate output voltages which are respectively proportional to the speeds of the motor and the rotary member.

5. A control arrangement as set forth in claim 1 wherein said means for monitoring the speed of rotation of the motor is in the form of a tachogenerator.

6. A control arrangement as set forth in claim 1 wherein the means for monitoring the speed of rotation of the rotary member has sensing means operable to sense a marking on the rotary member and to output an output signal in the form of pulses, the frequency of which is proportional to the speed of rotation of the rotary member, and a frequency-voltage converter connected to the output of the sensing means and operable to supply said second signal dependent on the speed of rotation of the rotary member.

7. A control arrangement as set forth in claim 1 wherein the motor speed control means comprises a rotary member speed adjusting means, an acceleration/braking adjusting means adapted to be connected to the rotary member speed adjusting means, a rotary speed generator means operatively associated with the electric motor and connected to the acceleration/braking adjusting means to receive a rising drive/braking current therefrom and a current limiting means connected between the acceleration/braking adjusting means and the rotary speed generator means and adapted to be actuated by the output signal from the comparison means.

8. A control arrangement as set forth in claim 1 wherein the electric motor is a dc motor.

9. A control arrangement as set forth in claim 8 further comprises means for reversing the polarity of the current supplied to the motor for the purposes of braking the motor relative to the operating condition in which the motor is driven.

10. A control arrangement as set forth in claim 1 wherein said adjusting means is so adjusted that in a slip-free drive mode the adjusted signal and the other signal which are supplied to the comparison means are of equal magnitudes.

11. A control arrangement as in claim 1 wherein the adjusting means includes means for adjusting one of the first and the second signals in accordance with the ratio between the diameter of the part of the rotary member around which the drive belt passes and the diameter of the drive pulley.

12. A control arrangement for power supplied to an electric motor to produce a controlled speed of rotation of the motor, which is operable by way of a belt drive having a drive belt and a drive pulley adapted to be driven by the motor to drive and brake a rotary member mounted in a balancing machine for ascertaining unbalance thereof, comprising:
- a means for monitoring the speed of rotation of the motor and operable to supply a first signal which is proportional to the speed of rotation of the motor;
- a means for monitoring the speed of rotation of the rotary member and operable to supply a second signal which is proportional to the speed of rotation of the rotary member;
- a sensing means for sensing a marking on the rotary member and for supplying an output signal to serve as a phase reference signal in determining the angular positioning of at least one unbalance to be measured on the rotary member;
- means for deriving the second signal from the output signal of the sensing means;
- an adjusting means for adjusting the strength of one of the first and second signals;
- a comparison means, connected to the adjusting means to receive the one adjusted signal and connected to receive the other of the first and second signals, for comparing the adjusted signal and the other signal and for supplying an output signal which is proportional to the result of the comparison; and
- a motor speed control means for receiving the output signal of the comparison means to control the speed of the motor for a slip-free drive and a slip-free braking of the rotary member.

13. A control arrangement as set forth in claim 12 wherein the electric motor is a dc motor.

14. A control arrangement as set forth in claim 13 including means for reversing the polarity of the current supplied to the motor for the purposes of braking the motor relative to the operating condition in which the motor is driven.

15. A control arrangement as set forth in claim 12 wherein said adjusting means is so adjusted that in a slip-free drive mode the adjusted signal and the other signal which are supplied to the comparison means are of equal magnitude.

16. A control arrangement as in claim 12 wherein the adjusting means includes means for adjusting one of the first and the second signals in accordance with the ratio between the diameter of the part of the rotary member around which the drive belt passes and the diameter of the drive pulley.

* * * * *